United States Patent [19]
Kawatani et al.

[11] Patent Number: 5,099,809
[45] Date of Patent: Mar. 31, 1992

[54] COMBUSTION CHAMBER FOR A DIESEL ENGINE

[75] Inventors: Toru Kawatani, Kawasaki; Eiji Mizote, Yokohama; Susumu Kohketsu, Tokyo; Tomomi Nakagawa, Kawasaki; Tetsuo Suzuki; Yoshihisa Yamaki, both of Yokohama, all of Japan

[73] Assignee: Mitsubishi Jidosha Kogyo Kabushiki Kaisha, Tokyo, Japan

[21] Appl. No.: 564,158

[22] Filed: Aug. 8, 1990

[30] Foreign Application Priority Data

Aug. 9, 1989 [JP] Japan .................. 1-92912[U]
Sep. 25, 1989 [JP] Japan .................. 1-112009[U]

[51] Int. Cl.⁵ ............................................. F02F 3/26
[52] U.S. Cl. ..................................... 123/276; 123/279
[58] Field of Search ......................... 123/276, 279, 305

[56] References Cited

U.S. PATENT DOCUMENTS

| | | | |
|---|---|---|---|
| 1,865,841 | 7/1932 | Cummins | 123/276 |
| 4,207,843 | 6/1980 | List et al. | 123/276 |
| 4,281,629 | 8/1981 | List | 123/279 |
| 4,779,587 | 10/1988 | Schweinzer et al. | 123/276 |
| 4,953,528 | 9/1990 | Oikawa et al. | 123/279 |

*Primary Examiner*—Tony M. Argenbright
*Assistant Examiner*—Robert E. Mates
*Attorney, Agent, or Firm*—Oblon, Spivak, McClelland, Maier & Neustadt

[57] ABSTRACT

A projection positioned in the center of a concave section of a toroidal combustion chamber is divided into a section with a steep slope extending from the bottom to the head surface and a section with a gentle slope. The head surface is in the form of a flattened conical trapezoid. Because of its shape, the projection makes it possible for the air which is close to the center section to flow close to the surface of a side wall of the concave section. The air which had been at the center section is added to the amount of air supplied for combustion and is mixed with the fuel in the vicinity of the surface of the side wall of the concave section. By setting the angle at which the air flows along the side wall surface (reentrant angle) in the combustion chamber, the flow of the air close to the side wall surface is made turbulent, which improves the agitation of the fuel.

5 Claims, 2 Drawing Sheets

COMBUSTION CHAMBER FOR A DIESEL ENGINE

BACKGROUND OF THE INVENTION

1. Field of the Invention

The present invention relates to a combustion chamber for a diesel engine, and more particularly to the configuration of a combustion chamber for reducing the creation of noxious components in the exhaust gas.

2. Discussion of Background

Conventionally, the structure is known for a combustion chamber of a diesel engine wherein the combustion chamber is provided as a concave section in the head surface of a piston and fuel is injected directly into the air which is compressed in this combustion chamber. This type of combustion chamber is referred to as a toroidal combustion chamber.

When the piston rises, the air inside the combustion chamber is caused to rotate to produce an eddying flow. Then, in order for the flow of fuel to intersect this eddying flow and be accelerated, the eddying flow must have the strength to rotate over the entire periphery so that the fuel is uniformly mixed in the circumferential direction, in the interval between consecutive injections.

In addition, the mixture of fuel and air is made uniform, and, in particular, there is no temporary concentration of fuel. Therefore, because the fuel is injected continuously, there is an effective reduction of black smoke and $NO_x$ which are noxious substances in the exhaust gases.

For these reasons, conventionally, it has been proposed that the shape of the concave section in the combustion chamber be made heart-shaped, or hemispherical or globular.

However, with a combustion chamber of any of the abovementioned shapes, the combustion at the side wall surface, where the best mixing of the fuel and air is considered to occur, is not complete, and there is a tendency for incomplete combustion to be obtained.

Specifically, the fuel which is injected into the center of the combustion chamber is not sufficiently dispersed and is not broken down into fine particles. It is therefore not in a state in which ignition can occur from contact with the air. As a result, the air at the center of the eddying flow does not particularly contribute to the effect of smooth ignition of the fuel. The mixture of the fuel and air close to the surface of the side wall is vigorously mixed, but there is a tendency toward a lack of air which is necessary for combustion. Therefore, when sufficient air to burn the fuel is lacking, incomplete combustion occurs and there is a large amount of noxious components produced in the exhaust gases.

In addition, because the mixing and agitation of the air and fuel at the concave section of the side wall surface depends on the strength of the eddying flow, it is difficult to guarantee a uniform mixing performance.

SUMMARY OF THE INVENTION

It is therefore an object of the present invention to provide, with due consideration to the drawbacks of such conventional combustion chambers, a combustion chamber for a diesel engine which can reduce the occurrence of noxious components, and, in particular, reduce the occurrence of black smoke and $NO_x$ in the exhaust gases.

Another object of the present invention is to provide a combustion chamber for a diesel engine into which a maximum amount of air can be fed at a position where the fuel can be vigorously mixed with the air.

A further object of the present invention is to provide a combustion chamber for a diesel engine in which the fuel and air are mixed with improved blending and agitation.

These objects are achieved in the present invention by the provision of a combustion chamber for a direct injection type of diesel engine, wherein the center of the bottom surface of a circular concave section formed in the head section of a piston has a projection which is built up in a conical shape. This projection is made up of a bottom section with a steep slope, positioned at the bottom surface of the concave section, and a conical trapezoid with a gentle slope on the top section positioned at the head surface. Accordingly, because the head is flat, the projection is prevented from interfering with the injection nozzle and the air at the center of the combustion chamber is guided toward the side wall surface.

In addition, the head angle of the conical trapezoid is made 10° to 30° smaller than the cone angle of the injection nozzle, and the angle between the sloped surface of the bottom section which faces the side wall surface of the concave section is set at 0° to 30°. Accordingly, the fuel which is sprayed from the injection nozzle is prevented from impacting the bottom section of the projection, and this fuel flows toward the side wall surface.

Further, in the fuel chamber for a diesel engine of the present invention, the re-entrant angle of the side wall surface is set at 20° to 30°. Accordingly, when the piston is elevated the flow of the air which enters the combustion chamber is turbulent so that laminar flow at the sidewall surface is prevented and the agitation of the fuel is improved.

BRIEF DESCRIPTION OF THE DRAWINGS

These and other objects, features, and advantages of the present invention will become more apparent from the following description of the preferred embodiments taken in conjunction with the accompanying drawings, in which.

DESCRIPTION OF PREFERRED EMBODIMENTS

Figure 1:
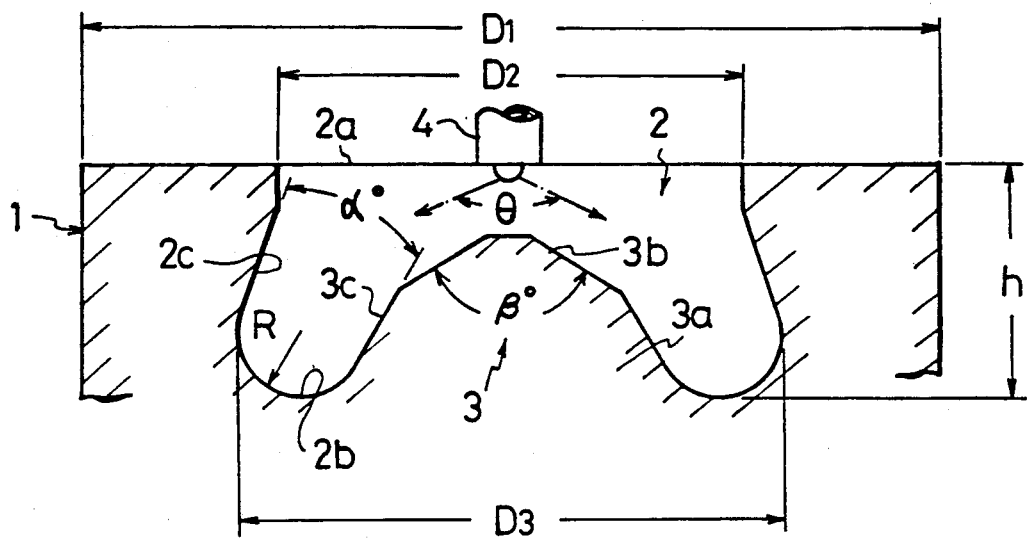
FIG. 1 is a cross-sectional view of one embodiment of a combustion chamber for a diesel engine according to the present invention.

Now referring to FIG. 1, in a combustion chamber 2 formed at the center of the head section of a piston 1, the inner diameter $D_2$ of an open end 2a of a circular depression is smaller than the maximum inner diameter $D_3$ of the inside of the combustion chamber ($D_2 < D_3$). A projection 3 is formed at the center of the bottom surface.

The projection 3 is larger than a conventional projection, and approximately one-half of the projection bottom (hereinafter referred to as the bottom section) 3a is a cone which rises steeply upright. The top half (hereinafter referred to as the top section) 3b, which is joined to the bottom section 3a, is an almost conical trapezoid with a surface which has a more gentle slope than the lower section 3a. The depth of a head section level surface, specifically, the section at the center of the combustion chamber 2 is slightly less than that of a conventional projection.

A head angle $\beta$ of the top section of the projection 3, specifically, of the conical trapezoid 3b is a slightly smaller angle than a cone angle $\theta$ of an injection nozzle 4 which is mounted above the projection 3 on the centerline of the combustion chamber 2. Specifically, the head angle $\beta$ is set at an angle 10° to 30° smaller than the cone angle $\theta$ [$\beta = \theta - (10°$ to $30°)$]. Therefore, by forming the top section 3b of the projection 3 as a conical trapezoid and the head section as a flat surface, obstruction of the injection nozzle 4 is avoided. In addition, by forming the bottom section 3a of the projection 3 as a steeply upright sloping surface and the top section 3b as a gently sloping surface, the fuel sprayed from the injection nozzle 4 is prevented from reaching a sloped surface 3c of the bottom section 3a of the projection 3.

A peripheral edge section and a side wall surface of the bottom section, specifically, a bottom arc section 2b which is joined to the bottom section 3a of the projection 3 of the combustion chamber 2, is formed so that a spherical body can follow along the circumference of the bottom section 3a of the projection 3 when moved with a rolling action, and the outer side section of the bottom surface of the combustion chamber 2 has a cross section which includes a part of a circle, specifically, in the shape of an arc. The radius R of this arc is set in the range of $R = 0.12 D_2$ to $0.18 D_2$. Here the value $D_2$ is the inside diameter of the open end 2a of the combustion chamber 2, as previously stated.

A side wall surface 2c joined to the bottom arc section 2b of the combustion chamber 2 is a sloped surface tapering with a decreasing diameter in the upward direction. The sidewall surface 2c and the sloped surface 3c of the bottom section 3a of the projection 3 are opposedly faced, either in parallel or at a slight angle $\alpha$. The angle $\alpha$ is set in a range of 0° to 30°. The maximum diameter $D_3$ of the combustion chamber 2 is close to the joint of the side wall surface 2c of the bottom arc section 2b of the combustion chamber 2.

In this configuration, the inner diameter $D_2$ of the combustion chamber 2 is small, the maximum diameter $D_3$ is large, and the deepest section has a large depth h, so that the projection 3 is large.

In the combustion chamber 2 of the shape shown in FIG. 1, the fuel sprayed from the injection nozzle 4 proceeds toward the bottom section of the side wall surface 2c of the combustion chamber 2 across a rotating flow of air, specifically, an eddying flow, which is created in the combustion chamber 2, and the spray is gradually distributed throughout a flow of new air. In addition, because the center projection 3 is large, the excess air in the vicinity of the side wall surface 2c of the combustion chamber 2 close to the center of the combustion chamber, which does not participate in the combustion, can be effectively utilized at the center of the flow of air to the combustion chamber 2. Furthermore, because the combustion chamber 2 has a small diameter $D_2$ at an open end 2a, a large maximum diameter $D_3$, and a large maximum depth h, even when the piston 1 is descending, a good eddying flow, specifically, a good airflow, can be maintained.

As a result, the atomization of the fuel is accelerated, ignition is improved, and the combustion of the fuel in the combustion chamber 2 is good so that the creation of black smoke is restrained. This results in an improvement in engine performance.

Figure 2:
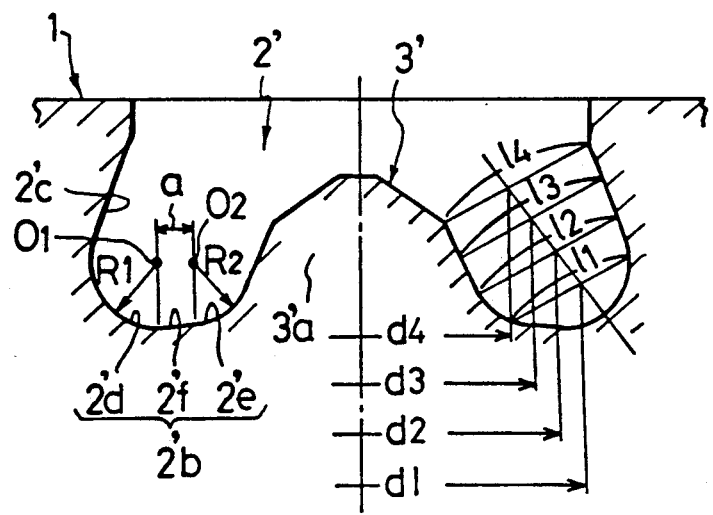
FIG. 2 is a cross-sectional view of another embodiment of a combustion chamber for a diesel engine according to the present invention.
Figure 3:
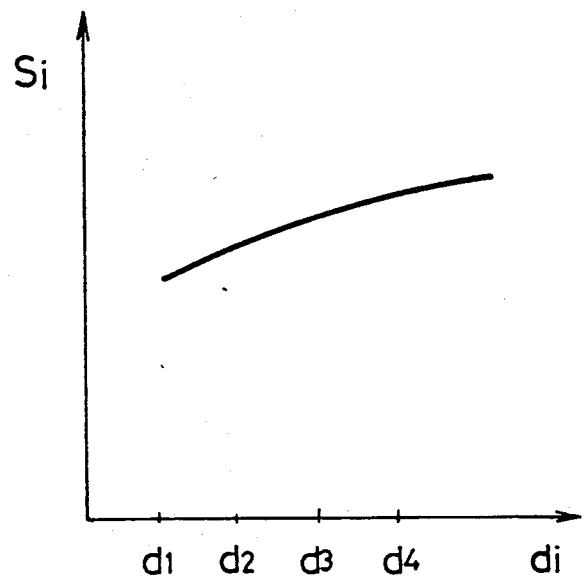
FIG. 3 is a graph which illustrates the relationship between the diameter and the surface area of the combustion chamber shown in FIG. 2.

FIG. 2 shows another embodiment of the combustion chamber of the present invention. Now referring to FIG. 2, a combustion chamber 2', in addition to the configuration of the combustion chamber 2 shown in FIG. 1 has an outer curved surface 2'd with a radius $R_1$ connected to a side wall surface 2'c of a bottom arc section 2'b, an inner curved surface 2'e with a radius $R_2$ connected to a bottom section 3'a of a projection 3' (where $R_1 \approx R_2$), and has an area (combustion area) $S_i = \pi \times d_1 \times l_1$ at a position where the diameter of the combustion chamber 2' is $d_1$. In addition, so that the area $S_i$ at the approximate center of the combustion chamber 2' is expanded as shown in FIG. 3, the centers $O_1$, $O_2$ of the radii $R_1$, $R_2$ of the curved surfaces 2'd, 2'e respectively, are separated only by a distance a (where a = approximately 2 to 6 mm), and a flat section 2'f is provided at the bottom surface of the combustion chamber 2', specifically, the bottom arc section 2'b.

The combustion chamber 2' with this shape causes the flame to expand toward the center of the combustion chamber 2', further improving combustion after ignition and thus providing reduced fuel costs.

Figure 4:
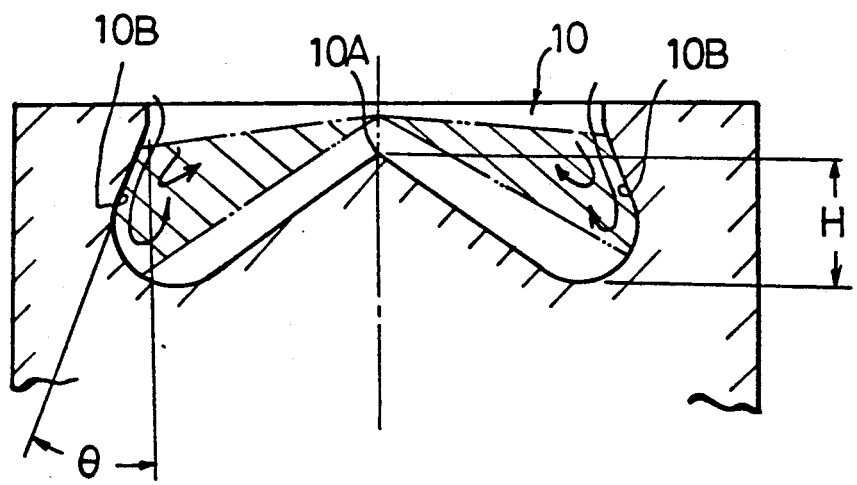
FIG. 4 is a cross-sectional view of yet another embodiment of a combustion chamber for a diesel engine according to the present invention.

FIG. 4 is a cross-sectional view of yet another embodiment of the combustion chamber of the present invention.

In FIG. 4, a combustion chamber 10 is formed as a flat surface with a circular concave section. In the center of the bottom surface a conical projection 10A is formed, projecting toward the top surface of a piston.

In the combustion chamber 10 a side wall surface 10B forms an angle of inclination, the so-called re-entrant angle 0, of 20° to 25° with the wall surface between the piston top surface and the bottom surface.

The head section of the conical projection 10A is of a height H and reaches a position at which the spray of fuel from a fuel injection orifice of a spray nozzle (omitted from the figure) which is positioned to face the center of the combustion chamber, is not obstructed.

Specifically, the re-entrant angle is formed so that the indentation in the side wall surface is large. As a result, the air flow is turbulent during the compression stroke. In addition, the height of the conical projection 10A is set so that the fuel at this position is guided toward the outer side. As a result, when the fuel is injected, the fuel sprayed at this position is not particularly dispersed, and, when minute particles are not formed, the particles are not in a condition in which they are ignited on contact with the air, therefore they are guided to a point where turbulent air flow is produced and adequate mixing can be carried out. In FIG. 4, the area shown in dashed lines is the range of injection of the fuel.

In FIG. 4, in comparison with conventional construction in which there is generally no re-entrant angle or in which the re-entrant angle is set toward the inside, the creation of laminar flow is prevented in the air introduced into the combustion chamber, and turbulent flow is readily produced when this air enters the indented part of the side wall. Accordingly, the fuel is guided toward the bottom surface from a position close to the conical projection 10A to a position where the flow is turbulent, which is the position with the most air, so that good ignition occurs. In particular, because the flow is turbulent and because the dispersed fuel is further dispersed in the combustion chamber, the propagation of the flame is not concentrated in any one part, but is smoothly spread throughout all regions of the combustion chamber.

By setting a re-entrant angle as outlined above, it is possible to maintain the eddying flow which is produced in the combustion chamber for a long period of time, therefore improving the propagation of the flame.

What is claimed is:

1. In an combustion chamber for a direct injection type of diesel engine comprising a built-up projection formed in a conical shape at the center of a bottom surface of a circular concave section which has a piston head section, and a peripheral edge section, formed as the arc of a circle, which is joined to this projection, and is connected to a side wall surface, the improvement, wherein the projection combines a bottom section positioned on a bottom surface side formed as a surface with a steep slope, and a top section positioned on a head section side formed as a conical trapezoid which has a gently sloping surface; the head angle of the conical trapezoid is formed 10° to 30° smaller than the cone angle of an injection nozzle; and the angle between the side wall surface of the combustion chamber and the sloped surface of the bottom section which faces the side wall surface is set at 0° to 30°.

2. The combustion chamber for a diesel engine as claimed in claim 1, wherein the bottom surface of the concave section, which connects the bottom section and the side wall section of the projection, is formed in a shape which allows a spherical body to be rolled in the circumferential direction; and the radius R of the bottom surface is equal to 0.12 D to 0.18 D (R=0.12 D to 0.18 D), where D is the inner diameter of the open end of the combustion chamber.

3. The combustion chamber for a diesel engine as claimed in claim 1, wherein the re-entrant angle of the side wall surface is set at 20° to 25°.

4. The combustion chamber for a diesel engine as claimed in claims 1 to 3, wherein the height of the projection is such that the projection extends to a position at which it does not obstruct the spray of fuel from the injection nozzle.

5. The combustion chamber for a diesel engine as claimed in claim 1, wherein the bottom surface of the concave section which connects the bottom section and the side wall section of the projection has a curved surface $2'd$ with a radius of $R_1$ on the outer side which is connected to the side wall, and has a curved surface $2'e$ with a radius of $R_2$ on the inner side which is connected to the bottom section; and a flat section $2'f$ is provided between the curved surface $2'd$ on the outer side and the curved surface $2'e$ on the inner side, with the centers of the radii $R_1$, $R_2$ being separated only by a distance a.

* * * * *